United States Patent
Li et al.

(10) Patent No.: US 11,047,379 B1
(45) Date of Patent: Jun. 29, 2021

(54) STATUS MONITORING AND FAILURE DIAGNOSIS SYSTEM FOR PLUNGER PUMP

(71) Applicant: AMERICAN JEREH INTERNATIONAL CORPORATION, Houston, TX (US)

(72) Inventors: Hailong Li, Yantai (CN); Haiping Cui, Yantai (CN); Haiping Xing, Yantai (CN); Jixin Wang, Yantai (CN); Peng Li, Yantai (CN); Xiaobin Li, Yantai (CN)

(73) Assignee: AMERICAN JEREH INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/932,289

(22) Filed: Jul. 17, 2020

(30) Foreign Application Priority Data

May 28, 2020 (CN) .......................... 202010470707.4

(51) Int. Cl.
*F04B 51/00* (2006.01)
*G01M 13/045* (2019.01)
(Continued)

(52) U.S. Cl.
CPC .......... *F04B 51/00* (2013.01); *G01M 13/021* (2013.01); *G01M 13/028* (2013.01); *G01M 13/045* (2013.01)

(58) Field of Classification Search
CPC ... F04B 51/00; G01M 13/021; G01M 13/028; G01M 13/045
See application file for complete search history.

(56) References Cited

U.S. PATENT DOCUMENTS 5,772,403 A * 6/1998 Allison ................. F04B 49/065
  417/44.2
6,192,864 B1 * 2/2001 Nishimura .......... F02D 41/3845
  123/456

(Continued)

FOREIGN PATENT DOCUMENTS

CN   109538460 A  *  3/2019
CN   111472971 A  *  7/2020

*Primary Examiner* — Jamel E Williams
(74) *Attorney, Agent, or Firm* — Xsensus LLP

(57) ABSTRACT

Disclosed is a status monitoring and fault diagnosis system for a plunger pump, including a monitoring and fault diagnosis device. The monitoring and fault diagnosis device monitors and diagnoses a hydraulic end assembly of a plunger pump. The monitoring and fault diagnosis device further monitors and diagnoses a power end assembly and/or a reduction gearbox assembly. Beneficial effects: The diagnosis system monitors and diagnoses not only a hydraulic end assembly, but also a power end assembly and/or a reduction gearbox assembly, that is, an equipment fault can be accurately predetermined in time for an entire plunger pump, so that high-pressure, large-displacement, and continuous operation requirements on fracturing sites at present are better satisfied, and on-demand maintenance is adopted instead of regular examination and maintenance, thereby saving labor, time, and materials to achieve economic efficiency; problems can be found as soon as possible, so that emergencies are prevented, damages are reduced, and maintenance costs are reduced; the utilization of the plunger pump is improved; and the service life of the plunger pump is extended.

15 Claims, 3 Drawing Sheets

(51) Int. Cl.
*G01M 13/021* (2019.01)
*G01M 13/028* (2019.01)

(56) References Cited

U.S. PATENT DOCUMENTS

| | | | |
|---|---|---|---|
| 10,823,176 B2* | 11/2020 | Gu | F04D 29/669 |
| 2004/0167738 A1* | 8/2004 | Miller | F04B 51/00 |
| | | | 702/114 |
| 2008/0196512 A1* | 8/2008 | Miller | F04B 51/00 |
| | | | 73/862.581 |
| 2010/0174496 A1* | 7/2010 | Adnan | F04D 15/0088 |
| | | | 702/34 |
| 2011/0236225 A1* | 9/2011 | Leugemors | F04B 47/02 |
| | | | 417/53 |
| 2012/0203507 A1* | 8/2012 | Thomeer | E21B 41/0092 |
| | | | 702/183 |
| 2018/0156015 A1* | 6/2018 | Ding | F04B 47/08 |
| 2018/0181830 A1* | 6/2018 | Luharuka | E21B 41/0021 |
| 2018/0202433 A1* | 7/2018 | Beisel | F04B 51/00 |
| 2018/0281284 A1* | 10/2018 | Elgar | B33Y 30/00 |
| 2019/0022306 A1* | 1/2019 | Gibson | A61M 5/14566 |

\* cited by examiner

STATUS MONITORING AND FAILURE DIAGNOSIS SYSTEM FOR PLUNGER PUMP

TECHNICAL FIELD

The present invention relates to the technical field of plunger pumps, and specifically relates to a status monitoring and fault diagnosis system for a plunger pump.

BACKGROUND

A plunger pump for fracturing in oil fields is equipment for pumping a fracturing medium at a high pressure in mining in oil and gas fields. A common plunger pump for fracturing in an oil field is a plunger-type reciprocating volumetric pump and mainly includes a power end assembly, a hydraulic end assembly, and a reduction gearbox assembly. The power end assembly includes a power end housing, a crankshaft, a connecting rod, a crosshead mechanism, a crosshead case, and a retainer, and the like. The hydraulic end assembly includes a valve case, a plunger, a suction valve, a discharge valve, and the like. A power source such as a diesel engine, an electric motor or a turbine engine supplies power to drive the reduction gearbox assembly and the power end assembly. The power end assembly drives the plunger to linearly reciprocate in a sealed cavity of the valve case of the hydraulic end assembly. The suction valve and the discharge valve alternately work in the valve case of the hydraulic end assembly to implement high-pressure pumping of a fracturing medium. The plunger pump pumps the fracturing medium into the stratum at a high pressure to press open the stratum to form a fracture for enhancing production and injection in oil and gas fields. Therefore, for all the mining in oil and gas fields, a plunger pump of fracturing equipment is a part that is most prone to fault.

Currently, a maintenance manner such as planned maintenance and emergency maintenance is usually used for a plunger pump for fracturing on well sites in oil and gas fields. The planned maintenance is also referred to as regular preventive maintenance. Site worker are asked for disassembly check, maintenance, and parts replacement according to production planning and experiences after operation for a period of time. In such a maintenance system, disassembly check is required regardless of whether the equipment encounters fault, causing a waste of labor and materials. Such a practice is somewhat blind, uneconomical, and inappropriate. The emergency maintenance is maintenance after fault occurs. Such maintenance causes significant damages to equipment and requires high maintenance costs. In addition, during actual construction, parts of plunger pumps specifically used on different sites have significantly different and highly unpredictable service lives due to factors such as complex oil and gas bearing strata and pressure fluctuations in high-pressure pumping. In common maintenance manners at present, an operation status of a plunger pump cannot be accurately monitored, and the fault occurrence rate of the plunger pump cannot be predetermined, resulting in reduced utilization and a shorter service life of the plunger pump and potential safety hazards to normal production of enterprises. During the operation of the plunger pump, a power end assembly and a reduction gearbox assembly supply power to the plunger pump to pump a medium at a high pressure, and a hydraulic end assembly is in direct contact with the high-pressure medium. Therefore, the hydraulic end assembly is a part that is the most prone to fault in the plunger pump. This is also the reason why only the hydraulic end is examined in existing monitoring and fault diagnosis.

With the ongoing development of ultra-high-pressure wells, ultra-deep wells, and horizontal wells in oil and gas fields, working conditions of the wells become increasingly severe, and high-pressure and large-displacement operations are required. Particularly, in unconventional oil and gas work, for example, shale gas work, the working pressure is sometimes up to 120 MPa, the working condition is severe, and in addition, continuous, large-displacement, and high-pressure operations are required. Compared with previous conventional intermittent fracturing work in oil and gas fields, a plunger pump may be examined and repaired in working gaps. For continuous, large-displacement, and high-pressure working conditions of shale gas fracturing work, consequently, the examination and repair time need to be greatly shortened, and parts of the plunger pump are prone to wear and tear. In current severe working conditions such as shale gas exploitation, a hydraulic end of the plunger pump fails more frequently. In addition, power end faults and reduction gearbox faults often occur, and as a result fracturing equipment is often suddenly interrupted. A plunger pump for fracturing is expensive. Once a hydraulic end assembly, a power end assembly, and a reduction gearbox assembly are damaged, maintenance costs are high, and site construction is severely affected. At present, existing plunger pump status monitoring for monitoring only a hydraulic end can no longer satisfy requirements of current continuous, large-displacement, high-pressure working conditions. For the existing hydraulic end monitoring technology, the prediction is not highly targeted, and a professional worker is needed to perform monitoring and analysis. As a result, a plunger pump fault cannot be found in time, application is limited, and a plunger pump maintenance problem cannot be completely resolved.

In view of this, there is an urgent need for a system used for comprehensively monitoring and diagnosis of a plunger pump, which can satisfy current requirements of continuous, large-displacement, and high-pressure working conditions.

SUMMARY

An objective of the present invention is to overcome the deficiency of the prior art. The diagnosis system monitors and diagnoses not only a hydraulic end assembly, but also a power end assembly and/or a reduction gearbox assembly. That is, an equipment fault can be accurately predetermined in time for an entire plunger pump, so that parts of the plunger pump operate in an optimal state, and high-pressure, large-displacement, and continuous operation requirements on fracturing sites at present are better satisfied. Instead of regular examination and maintenance, on-demand maintenance is performed at a proper time according to the condition of the monitored plunger pump, thereby saving labor, time, and materials to achieve economic efficiency; problems, the position of a fault, and a part to be replaced can be found as soon as possible, so that sudden emergencies are prevented, damages are reduced, and maintenance costs are reduced; the utilization of the plunger pump is improved; and the service life of the plunger pump is extended.

The objective of the present invention is achieved by using the following technical measure: A status monitoring and fault diagnosis system for a plunger pump includes a monitoring and fault diagnosis device, wherein the monitoring and fault diagnosis device monitors and diagnoses a hydraulic end assembly of a plunger pump, and the monitoring and fault diagnosis device further monitors and diagnoses a power end assembly and/or a reduction gearbox assembly.

Further, the monitoring and fault diagnosis device includes a plurality of sensors, a data acquisition module, and a data analysis and diagnosis module, the sensors are used for monitoring, the data acquisition module is connected to the sensors, the data acquisition module is configured to transfer signals detected by the sensors to the data analysis and diagnosis module, and the sensors include temperature sensors, vibration sensors, pressure sensors, and position sensors.

Further, the monitoring and fault diagnosis device monitors and diagnoses a crankshaft bearing of the power end assembly.

Further, sensors used for monitoring the crankshaft bearing are disposed on an outer surface of the crankshaft bearing, and the sensors used for monitoring the crankshaft bearing are a temperature sensor and a vibration sensor.

Further, the monitoring and fault diagnosis device monitors and diagnoses a crosshead mechanism of the power end assembly.

Further, sensors used for monitoring the crosshead mechanism are disposed on an outer surface of a crosshead case, and the sensors used for monitoring the crosshead mechanism are a temperature sensor and a vibration sensor.

Further, the monitoring and fault diagnosis device monitors and diagnoses a crankshaft of the power end assembly.

Further, a sensor used for monitoring the crankshaft is disposed on a side surface of a non-input end of the crankshaft, and the sensor used for monitoring the crankshaft is a position sensor.

Further, the monitoring and fault diagnosis of the hydraulic end assembly includes monitoring and fault diagnosis of a valve case, a liquid inlet manifold, and a discharge manifold.

Further, the monitoring and fault diagnosis of the valve case further includes monitoring and fault diagnosis of an upper valve and a lower valve.

Further, a sensor used for monitoring the upper valve and the lower valve is disposed on an outer surface of the valve case, and the sensor used for monitoring the outer surface of the valve case is a vibration sensor.

Further, the number of the vibration sensors disposed on the outer surface of the valve case is set correspondingly according to a specific number of cylinders of the plunger pump. Further, a sensor used for monitoring the liquid inlet manifold is disposed on the liquid inlet manifold, and the sensor used for monitoring the liquid inlet manifold in real time is a pressure sensor.

Further, a sensor used for monitoring the discharge manifold is disposed on the discharge manifold, and the sensor used for monitoring the discharge manifold in real time is a pressure sensor.

Further, sensors used for monitoring the reduction gearbox assembly are disposed on an outer surface of the reduction gearbox assembly, and the sensors used for monitoring the reduction gearbox assembly are a temperature sensor and a vibration sensor.

Further, the data analysis and diagnosis module includes a data storage module, a data analysis and processing module, and a data and fault display module; the data storage module has functions of monitoring the setting of the parameters of the system, setting a storage strategy, and real-time storing test data; the data analysis and processing module is configured to analyze and process real-time test data, and outputs status information of parts of the plunger pump based on the analysis; and the data and fault display module is configured to provide viewing of real-time monitoring data information of the plunger pump, display the status information of the parts of the plunger pump, and display and prompt the fault alarm information of the plunger pump.

Compared with the prior art, beneficial effects of the present invention are as follows: the diagnosis system monitors and diagnoses not only a hydraulic end assembly, but also a power end assembly and/or a reduction gearbox assembly, that is, an equipment fault can be accurately predetermined in time for an entire plunger pump, so that parts of the plunger pump operate in an optimal state, and high-pressure, large-displacement, and continuous operation requirements on fracturing sites at present are better satisfied. Instead of regular examination and maintenance, on-demand maintenance is performed at a proper time according to the condition of the monitored plunger pump, thereby saving labor, time, and materials to achieve economic efficiency; problems, the position of a fault, and a part to be replaced can be found as soon as possible, so that sudden emergencies are prevented, damages are reduced, and maintenance costs are reduced; the utilization of the plunger pump is improved; and the service life of the plunger pump is extended. The diagnosis system implements highly targeted prediction, especially, monitoring and diagnosis of a hydraulic end, and a professional worker does not need to perform monitoring and analysis. For the entire plunger pump, monitoring, acquisition, data comparison, and analysis are performed, and the data and fault display module is used to view data of the parts in real time, to raise an alarm as soon as fault occurs.

The present invention is described below in detail with reference to the accompanying drawings and specific implementations.

Wherein: 1. Power end assembly, 2. Hydraulic end assembly, 3. Reduction gearbox assembly, 4. Discharge manifold, 5. Power end housing, 6. Crankshaft bearing, 7. Crankshaft, 8. Connecting rod, 9. Crosshead case, 10. Crosshead mechanism, 11. Plunger, 12. Valve case, 13. Liquid inlet manifold, 14. Lower valve, and 15. Upper valve.

DESCRIPTION OF THE IMPLEMENTATIONS

Figure 1:
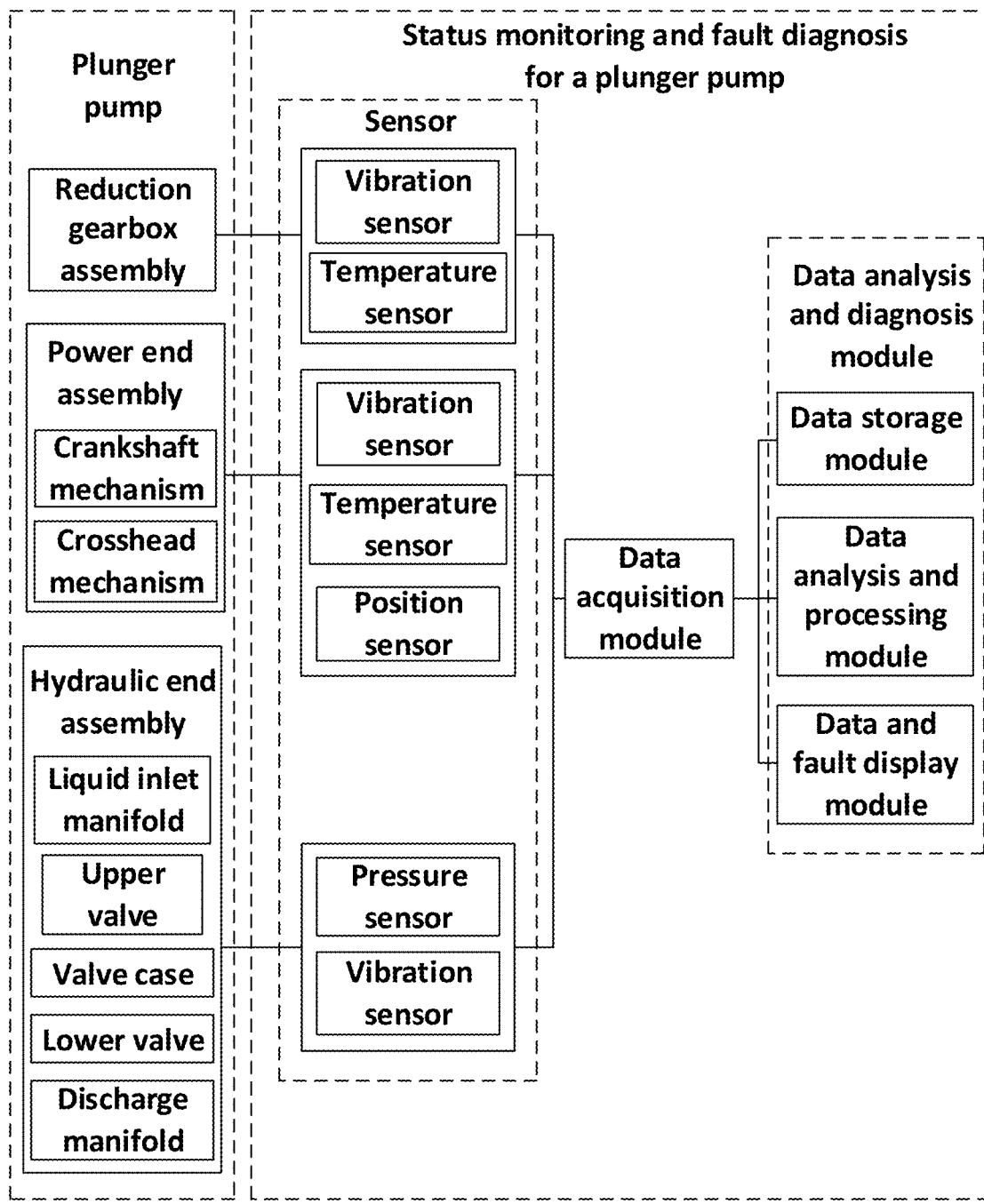
FIG. 1 is a schematic structural diagram of a status monitoring and fault diagnosis system for a plunger pump.
Figure 2:
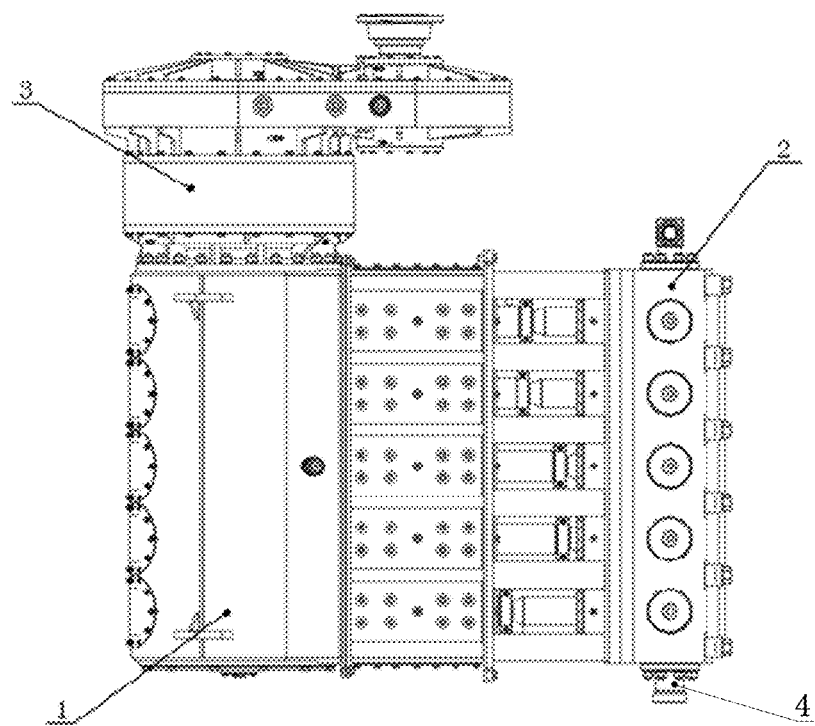
FIG. 2 is a schematic diagram of the external structure of a plunger pump viewed from the top.
Figure 3:
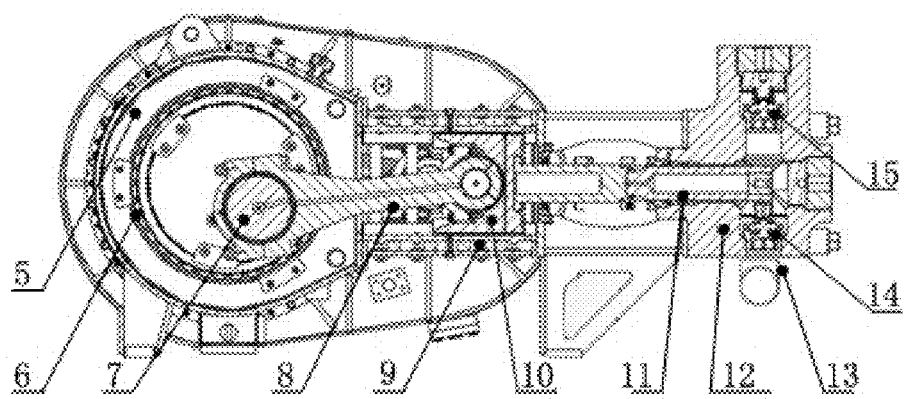
FIG. 3 is a schematic diagram of the internal structure of a plunger pump.
Figure 4:
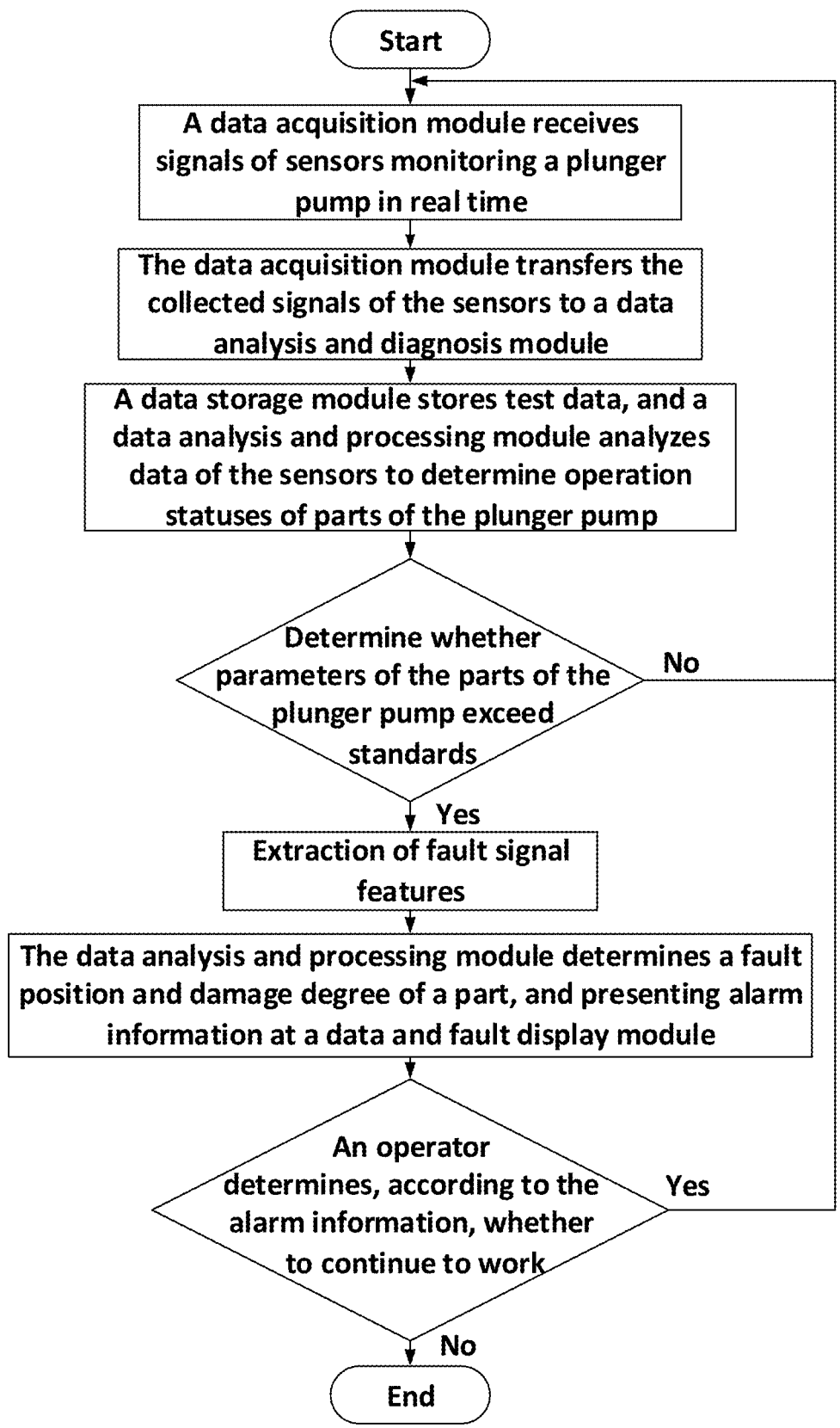
FIG. 4 is a method flowchart of a status monitoring and fault diagnosis system for a plunger pump.

As shown in FIGS. 1 to 4, a status monitoring and fault diagnosis system for a plunger pump includes a monitoring and fault diagnosis device. The monitoring and fault diagnosis device monitors and diagnoses a hydraulic end assembly 2 of a plunger pump. The monitoring and fault diagnosis device further monitors and diagnoses a power end assembly 1 and/or a reduction gearbox assembly 3. The plunger pump includes the power end assembly 1, the hydraulic end assembly 2, and the reduction gearbox assembly 3. The power end assembly 1 includes a power end housing 5, a crosshead case 9, and a retainer. A crankshaft mechanism is disposed in the power end housing 5. The crankshaft mechanism includes a crankshaft 7 and a crankshaft bearing 6. A connecting rod 8, a crosshead mechanism 10, and the like are disposed in the crosshead case 9. The hydraulic end assembly 2 includes a valve case 12, a plunger 11, a suction valve, a discharge valve, an upper valve 15, a lower valve 14, and the like. The crankshaft 7 rotates over the crankshaft bearing 6. One end of the connecting rod 8 is connected to the crankshaft 7, and the other end of the connecting rod 8 is connected to the crosshead mechanism 10. The other end of the crosshead mechanism 10 is connected to the plunger 11 through a pull rod. An external power source drives the crankshaft 7 to rotate through the reduction gearbox assembly 3. The rotation of the crankshaft 7 is eventually converted into linear reciprocation of the plunger 11, to open or close the suction valve and the discharge valve. That is, the hydraulic end assembly 2 sucks in low-pressure liquid and discharges high-pressure liquid.

The monitoring and fault diagnosis device includes a plurality of sensors, a data acquisition module, and a data analysis and diagnosis module. The sensors are used for monitoring. The data acquisition module is connected to the sensor. The data acquisition module is configured to transfer signals detected by the sensors to the data analysis and diagnosis module. The sensors include temperature sensors, vibration sensors, pressure sensors, and position sensors. The data acquisition module is separately connected to the temperature sensors, the vibration sensors, the pressure sensors, and the position sensors. The data acquisition module is configured to: acquire signals output from the vibration sensors, the temperature sensors, the pressure sensors, and the position sensors, and transfer the signals to the data analysis and diagnosis module.

The monitoring and fault diagnosis device monitors and diagnoses the crankshaft bearing 6 of the power end assembly 1.

Sensors used for monitoring the crankshaft bearing 6 are disposed on an outer surface of the crankshaft bearing 6. The sensors used for monitoring the crankshaft bearing 6 are a temperature sensor and a vibration sensor. The sensors are used for monitoring real-time vibration and temperature of the crankshaft bearing 6 and outputting a vibration signal and a temperature signal of the crankshaft bearing 6.

The monitoring and fault diagnosis device monitors and diagnoses the crosshead mechanism 10 of the power end assembly 1.

Sensors used for monitoring the crosshead mechanism 10 are disposed on an outer surface of the crosshead case 9. The sensors used for monitoring the crosshead mechanism 10 are a temperature sensor and a vibration sensor. The sensors are used for monitoring real-time vibration and temperature of the crosshead mechanism 10 and outputting a vibration signal and a temperature signal of the crosshead mechanism 10.

The monitoring and fault diagnosis device monitors and diagnoses the crankshaft 7 of the power end assembly 1.

A sensor used for monitoring the crankshaft 7 is disposed on a side surface of a non-input end of the crankshaft 7. The sensor used for monitoring the crankshaft 7 is a position sensor. The plunger pump requires an external power source. Regardless of whether the power source is an electric motor or a turbine engine, the rotational speed needs to be reduced by the reduction gearbox assembly 3 before it can drive the crankshaft 7 to rotate. Therefore, an input end is one end, connected to the reduction gearbox assembly 3, of the crankshaft 7, that is, in terms of power input. The non-input end is the other end, opposite the input end, of the crankshaft 7. The crankshaft 7 includes a bellcrank and a journal. For example, a three-cylinder plunger pump has three bellcranks and four journals. A five-cylinder plunger pump has five bellcranks and six journals. The bellcranks and the journals are disposed alternately. The position sensor on the crankshaft 7 is used for monitoring a real-time angle of each bellcrank of the crankshaft 7 and outputting a position signal of the bellcrank of the crankshaft 7.

The monitoring and fault diagnosis of the hydraulic end assembly 2 includes monitoring and fault diagnosis of the valve case 12, a liquid inlet manifold 13, and a discharge manifold 4.

The monitoring and fault diagnosis of the valve case 12 further includes monitoring and fault diagnosis of the upper valve 15 and the lower valve 14. The hydraulic end assembly 2 is monitored comprehensively. The entire valve case and the upper valve 15 and the lower valve 14 in each cylinder are all monitored and diagnosed to find specific fault points as soon as possible. Compared with the prior art, it is not necessary to examine cylinders one by one.

A sensor used for monitoring the upper valve 15 and the lower valve 14 is disposed on an outer surface of the valve case 12. The sensor used for monitoring the valve case 12, the upper valve 15 and the lower valve 14 is a vibration sensor. The sensor is used for monitoring the vibration of the upper valve 15, the lower valve 14, and the valve case 12, and outputting vibration signals of the upper valve 15, the lower valve 14, and the valve case 12 at the hydraulic end.

The number of the vibration sensors disposed on the outer surface of the valve case 12 is set correspondingly according to the specific number of cylinders of the plunger pump. For example, if two vibration sensors form a group, the positions of each group of vibration sensors respectively correspond to the positions of the upper valve 15 and the lower valve 14 in each cylinder of the plunger pump. That is, a five-cylinder plunger pump is provided with five groups, and a three-cylinder plunger pump is provided with three groups. In such a design, highly targeted prediction is performed for a fault in each cylinder. Certainly, a vibration sensor may be further disposed on the valve case 12, to separately detect the valve case 12.

A sensor used for monitoring the liquid inlet manifold 13 is disposed on the liquid inlet manifold 13. The sensor used for monitoring the liquid inlet manifold 13 in real time is a pressure sensor. A sensor used for monitoring the discharge manifold 4 is disposed on the discharge manifold 4. The sensor used for monitoring the discharge manifold 4 in real time is a pressure sensor.

The plunger pump is a three-cylinder plunger pump, a five-cylinder plunger pump or the like. The quantity of cylinders is equal to the quantity of liquid inlets and the quantity of liquid outlets. One liquid inlet manifold 13 is separately connected to a suction valve of each cylinder, and one discharge manifold 4 is separately connected to a discharge valve of each cylinder. The three-cylinder plunger pump has three liquid inlet manifolds 13 and three discharge manifolds 4. One pressure sensor is mounted on each liquid inlet manifold 13 for monitoring the pressure at the liquid inlet manifold 13 of each cylinder and outputting a pressure signal of the liquid inlet manifold 13. One pressure sensor is mounted on each discharge manifold 4 for monitoring the pressure at the discharge manifold 4 of each cylinder and outputting a pressure signal of the discharge manifold 4.

Sensors used for monitoring the reduction gearbox assembly 3 are disposed on an outer surface of the reduction gearbox assembly 3. The sensors used for monitoring the reduction gearbox assembly 3 are a temperature sensor and a vibration sensor. The sensors are used for monitoring real-time vibration and temperature of the reduction gearbox assembly 3 and outputting a vibration signal and a temperature signal of the reduction gearbox assembly 3.

The data analysis and diagnosis module includes a data storage module, a data analysis and processing module, and a data and fault display module; the data storage module has functions of monitoring the setting of the parameters of the system, setting a storage strategy, and real-time storing test data; the data analysis and processing module is configured to analyze and process real-time test data, and outputs status information of parts of the plunger pump based on the analysis; and the data and fault display module is configured to provide viewing of real-time monitoring data information of the plunger pump, display the status information of the parts of the plunger pump, and display and prompt the fault alarm information of the plunger pump.

The data analysis and processing module analyzes a vibration sensing signal effective value of the crankshaft bearing 6, a temperature value, and an operation parameter of the plunger pump to determine the operation status of the crankshaft bearing 6. If a monitoring standard value is not exceeded, it is indicated that there is no fault. If the monitoring standard value is exceeded, data analysis is performed to determine the specific corresponding fault type, and alarm information is output at the data and fault display module for prompt and alarm.

The data analysis and processing module analyzes a vibration sensing signal effective value of the crosshead mechanism 10, a temperature value, and an operation parameter of the plunger pump, to determine the operation status of the crosshead mechanism 10 of the plunger pump. If a monitoring standard value is not exceeded, it is indicated that there is no fault. If the monitoring standard value is exceeded, data analysis is performed to determine the specific corresponding fault type, and alarm information is output at the data and fault display module for prompt and alarm.

The data analysis and processing module analyzes a measurement point of the position sensor of the crankshaft 7 to obtain a real-time angle of the bellcrank, to determine the operation statuses of the upper valve 15 and the lower valve 14 of the plunger pump. A vibration sensing signal effective value of each cylinder at the hydraulic end, pressure data of the suction manifold and the discharge manifold 4, and the operation parameter of the plunger pump are analyzed comprehensively to determine the movement statuses of the upper valve 15, the lower valve 14, and the valve case 12 on each cylinder at the hydraulic end of the plunger pump. If a monitoring standard value is not exceeded, it is indicated that there is no fault. If the monitoring standard value is exceeded, data analysis is performed to determine the specific corresponding fault type, and alarm information is output at the data and fault display module for prompt and alarm.

For the entire plunger pump, monitoring, acquisition, data comparison, and analysis are performed, and the data and fault display module is used to view data of the parts in real time, to raise an alarm as soon as fault occurs. A professional worker does not need to perform monitoring and analysis, and a plunger pump fault is found in time, so that the maintenance problems of the plunger pumps can be completely resolved.

A diagnosis method of the status monitoring and fault diagnosis system for a plunger pump is as follows:

(1) receiving signals of sensors mounted at parts of the plunger pump in real time by the data acquisition module;

(2) transferring the collected signals of the sensors to the data analysis and diagnosis module by the data acquisition module;

(3) storing test data by the data storage module, and analyzing the data of the sensors to determine the operation statuses of the parts of the plunger pump by the data analysis and processing module;

(4) determining whether parameters of the parts of the plunger pump exceed standards, and if yes, performing step 5, or if not, returning to step 1 to continue with real-time monitoring;

(5) extracting the fault signal features;

(6) determining a fault position and damage degree of a part by the data analysis and processing module, and presenting alarm information at the data and fault display module; and (7) determining whether to continue to operation by an operator according to the alarm information, and if yes, returning to step 1, or if not, stopping for examination and repair.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

What is claimed is:

1. A status monitoring and fault diagnosis system for a plunger pump, comprising a monitoring and fault diagnosis device, wherein the monitoring and fault diagnosis device monitors and diagnoses a hydraulic end assembly of a plunger pump, and the monitoring and fault diagnosis device further monitors and diagnoses a power end assembly and/or a reduction gearbox assembly; and the monitoring and fault diagnosis device comprises a sensor, a data acquisition module, and a data analysis and diagnosis module, the sensor is used for monitoring, the data acquisition module is connected to the sensor, the data acquisition module is configured to transfer signals detected by the sensor to the data analysis and diagnosis module; and wherein the data analysis and diagnosis module comprises a data storage module, a data analysis and processing module, and a data and fault display module; the data storage module has functions of monitoring the setting of the parameters of the system, setting a storage strategy, and real-time storing test data; the data analysis and processing module analyzes and processes real-time test data, and outputs status information of parts of the plunger pump based on the analysis; and the data and fault display module is configured to provide viewing of real-time monitoring data information of the plunger pump, display the status information of the parts of the plunger pump, and display and prompt the fault alarm information of the plunger pump.

2. The status monitoring and fault diagnosis system for a plunger pump according to claim 1, the sensor are a plurality of sensors, and the sensors comprise a temperature sensor, a vibration sensor, a pressure sensor, and a position sensor.

3. The status monitoring and fault diagnosis system for a plunger pump according to claim 2, wherein the monitoring and fault diagnosis device monitors and diagnoses a crankshaft bearing of the power end assembly.

4. The status monitoring and fault diagnosis system for a plunger pump according to claim 3, wherein sensors used for monitoring the crankshaft bearing are disposed on an outer surface of the crankshaft bearing, and the sensors used for monitoring the crankshaft bearing are a temperature sensor and a vibration sensor.

5. The status monitoring and fault diagnosis system for a plunger pump according to claim 2, wherein the monitoring and fault diagnosis device monitors and diagnoses a crosshead mechanism of the power end assembly.

6. The status monitoring and fault diagnosis system for a plunger pump according to claim 5, wherein sensors used for monitoring the crosshead mechanism are disposed on an outer surface of a crosshead case, and the sensors used for monitoring the crosshead mechanism are a temperature sensor and a vibration sensor.

7. The status monitoring and fault diagnosis system for a plunger pump according to claim 2, wherein the monitoring and fault diagnosis device monitors and diagnoses a crankshaft of the power end assembly.

8. The status monitoring and fault diagnosis system for a plunger pump according to claim 7, wherein a sensor used for monitoring the crankshaft is disposed on a side surface of a non-input end of the crankshaft, and the sensor used for monitoring the crankshaft is a position sensor.

9. The status monitoring and fault diagnosis system for a plunger pump according to claim 2, wherein the monitoring and fault diagnosis of the hydraulic end assembly comprises monitoring and fault diagnosis of a valve case, a liquid inlet manifold, and a discharge manifold.

10. The status monitoring and fault diagnosis system for a plunger pump according to claim 9, wherein the monitoring and fault diagnosis of the valve case further comprises monitoring and fault diagnosis of an upper valve and a lower valve.

11. The status monitoring and fault diagnosis system for a plunger pump according to claim 10, wherein a sensor used for monitoring the upper valve and the lower valve is disposed on an outer surface of the valve case, and the sensor used for monitoring at the outer surface of the valve case is a vibration sensor.

12. The status monitoring and fault diagnosis system for a plunger pump according to claim 11, wherein the number of the vibration sensors disposed on the outer surface of the valve case is set according to a specific number of cylinders of the plunger pump.

13. The status monitoring and fault diagnosis system for a plunger pump according to claim 9, wherein a sensor used for monitoring the liquid inlet manifold is disposed on the liquid inlet manifold, and the sensor used for monitoring the liquid inlet manifold in real time is a pressure sensor.

14. The status monitoring and fault diagnosis system for a plunger pump according to claim 9, wherein a sensor used for monitoring the discharge manifold is disposed on the discharge manifold, and the sensor used for monitoring the discharge manifold in real time is a pressure sensor.

15. The status monitoring and fault diagnosis system for a plunger pump according to claim 2, wherein sensors used for monitoring the reduction gearbox assembly are disposed on an outer surface of the reduction gearbox assembly, and the sensors used for monitoring the reduction gearbox assembly are a temperature sensor and a vibration sensor.

* * * * *